US010909260B2

(12) United States Patent
Sanghi et al.

(10) Patent No.: US 10,909,260 B2
(45) Date of Patent: Feb. 2, 2021

(54) METHODS FOR DATA MASKING AND DEVICES THEREOF

(71) Applicant: JPMorgan Chase Bank, N.A., New York, NY (US)

(72) Inventors: Gaurav Sanghi, Frisco, TX (US); Sree Venkatesh Jagannathan, Frisco, TX (US); Vikram Patel, Wesley Chapel, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 211 days.

(21) Appl. No.: 16/145,713

(22) Filed: Sep. 28, 2018

(65) Prior Publication Data
US 2019/0377895 A1  Dec. 12, 2019

Related U.S. Application Data

(60) Provisional application No. 62/681,921, filed on Jun. 7, 2018.

(51) Int. Cl.
G06F 21/62 (2013.01)
G06F 16/242 (2019.01)
G06F 16/907 (2019.01)
G06F 16/2455 (2019.01)

(52) U.S. Cl.
CPC ........ G06F 21/6227 (2013.01); G06F 16/242 (2019.01); G06F 16/24565 (2019.01); G06F 16/907 (2019.01); G06F 21/6245 (2013.01)

(58) Field of Classification Search
CPC ............ G06F 21/6227; G06F 21/6245; G06F 21/6254; G06F 16/242; G06F 16/24565; G06F 16/907
See application file for complete search history.

(56) References Cited

U.S. PATENT DOCUMENTS

| 2008/0065665 | A1 | 3/2008 | Pomroy et al. |
| 2009/0100527 | A1 | 4/2009 | Booth et al. |
| 2010/0030795 | A1 | 2/2010 | Pattabhi et al. |
| 2010/0205189 | A1 | 8/2010 | Ebrahimi et al. |
| 2013/0144901 | A1 | 6/2013 | Ho et al. |
| 2017/0323119 | A1 | 11/2017 | Harp |

OTHER PUBLICATIONS

Tang, Why You Need a Database Audit Trail, Apr. 2017.*
International Search Report in corresponding International Application No. PCT/US19/35825, dated Aug. 26, 2019.

* cited by examiner

Primary Examiner — Minh Dinh
(74) Attorney, Agent, or Firm — Greenblum & Bernstein, P.L.C

(57) ABSTRACT

Methods, non-transitory computer readable media, and an apparatus that includes obtaining a database and metadata associated with the database in response to a request for data masking. Next, the obtained metadata is compared with the received request to determine when the obtained metadata validates the received request. A data masking operation is performed on the obtained database at a column level when the determination indicates the received request is validated. A record of the performance of the data masking operation on the obtained database at the column level is stored.

18 Claims, 8 Drawing Sheets

METHODS FOR DATA MASKING AND DEVICES THEREOF

DETAILED DESCRIPTION

This application claims the benefit of U.S. Provisional Patent Application Ser. No. 62/681,921, filed Jun. 7, 2018, which is hereby incorporated by reference in its entirety.

FIELD

This technology generally relates to methods and devices for data security and, more particularly, to methods for data masking and devices thereof.

BACKGROUND

Dynamic data masking refers to securing data in real time by masking sensitive data as it is accessed, such that sensitive information is not provided to unauthorized recipients. Thus, for example, when a database query is received from an unauthorized or restricted user or application, dynamic data masking may be employed to mask some or all of the data so that sensitive data is not exposed to the requestor. To implement data masking, some prior approaches have analyzed and modified data queries to cause resulting data that is retrieved to be masked. Other prior approaches have defined rules implemented at the database level that specify specific tables and columns to be masked in anticipation of queries. Unfortunately, these prior approaches are not effective because they do not adapt to new type of data attributes and also requires regular maintenance to adapt to the ever changing requirements for data masking.

SUMMARY

A method for data masking includes obtaining a database and metadata associated with the database in response to a request for data masking. Next, the obtained metadata is compared with the received request to determine when the obtained metadata validates the received request. A data masking operation is performed on the obtained database at a column level when the determination indicates the received request is validated. A record of the performance of the data masking operation on the obtained database at the column level is stored.

A non-transitory computer readable medium having stored thereon instructions for data masking comprising machine executable code which when executed by at least one processor, causes the processor to perform steps including obtaining a database and metadata associated with the database in response to a request for data masking. Next, the obtained metadata is compared with the received request to determine when the obtained metadata validates the received request. A data masking operation is performed on the obtained database at a column level when the determination indicates the received request is validated. A record of the performance of the data masking operation on the obtained database at the column level is stored.

A data masking apparatus including at least one of configurable hardware logic configured to be capable of implementing or a processor coupled to a memory and configured to execute programmed instructions stored in the memory to obtain a database and metadata associated with the database in response to a request for data masking. Next, the obtained metadata is compared with the received request to determine when the obtained metadata validates the received request. A data masking operation is performed on the obtained database at a column level when the determination indicates the received request is validated. A record of the performance of the data masking operation on the obtained database at the column level is stored.

This technology provides a number of advantages including providing a method, non-transitory computer readable medium, apparatus, and system that provides more effective and accurate data masking. Additionally, with the disclosed technology the masked data can easily be recoverable from any point of failure during the masking process. Furthermore, the disclosed technology secures the data while the data masking process is performed.

BRIEF DESCRIPTION OF THE DRAWINGS

FIG. 6 is an exemplary illustration of disabling constraints;

FIG. 8 is an exemplary illustration of enabling the disabled constraints.

DETAILED DESCRIPTION

Figure 1:
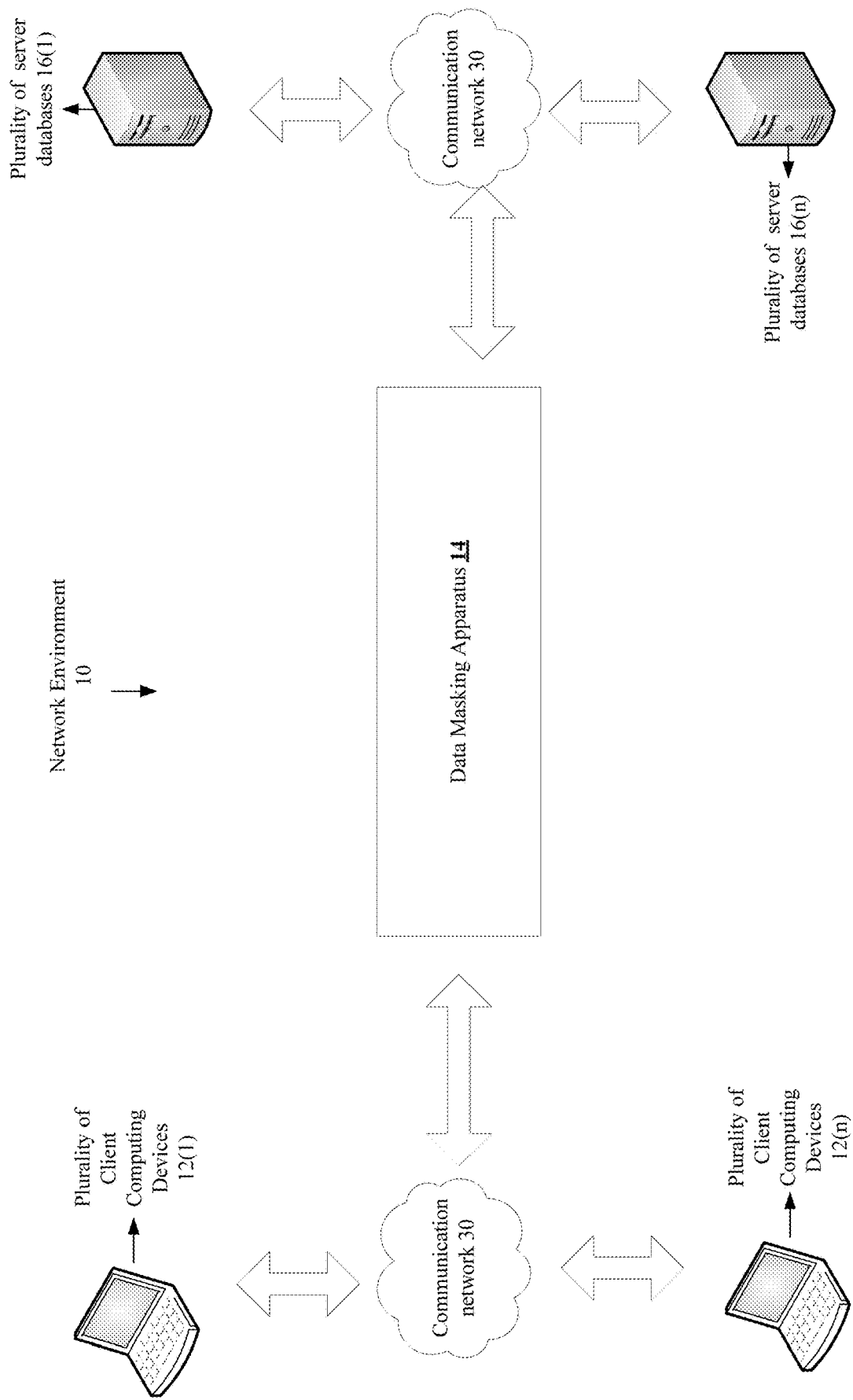
FIG. 1 is an example of a block diagram of a data masking apparatus for data masking.
Figure 2:
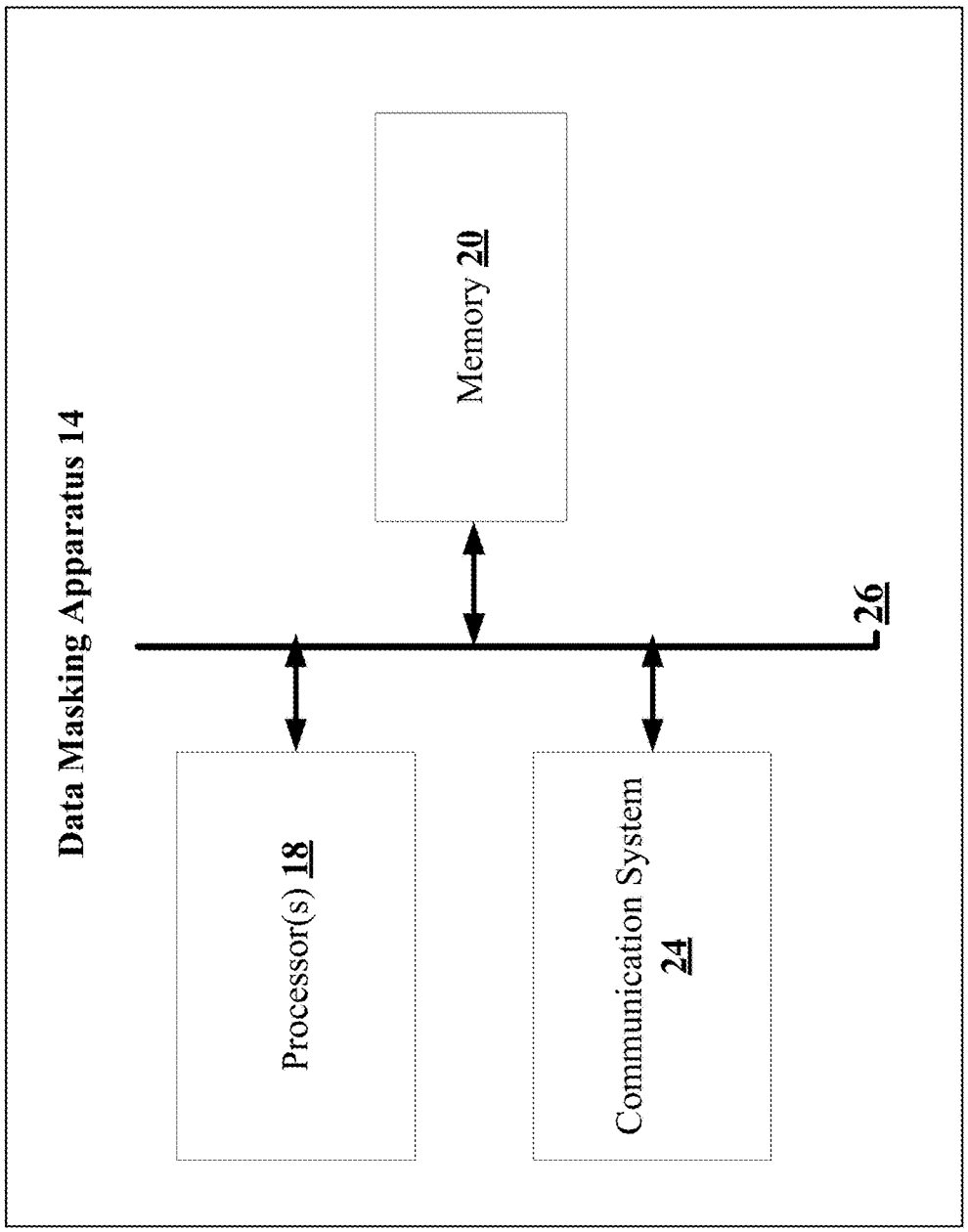
FIG. 2 is an example of a block diagram of a data masking apparatus.
Figure 3:
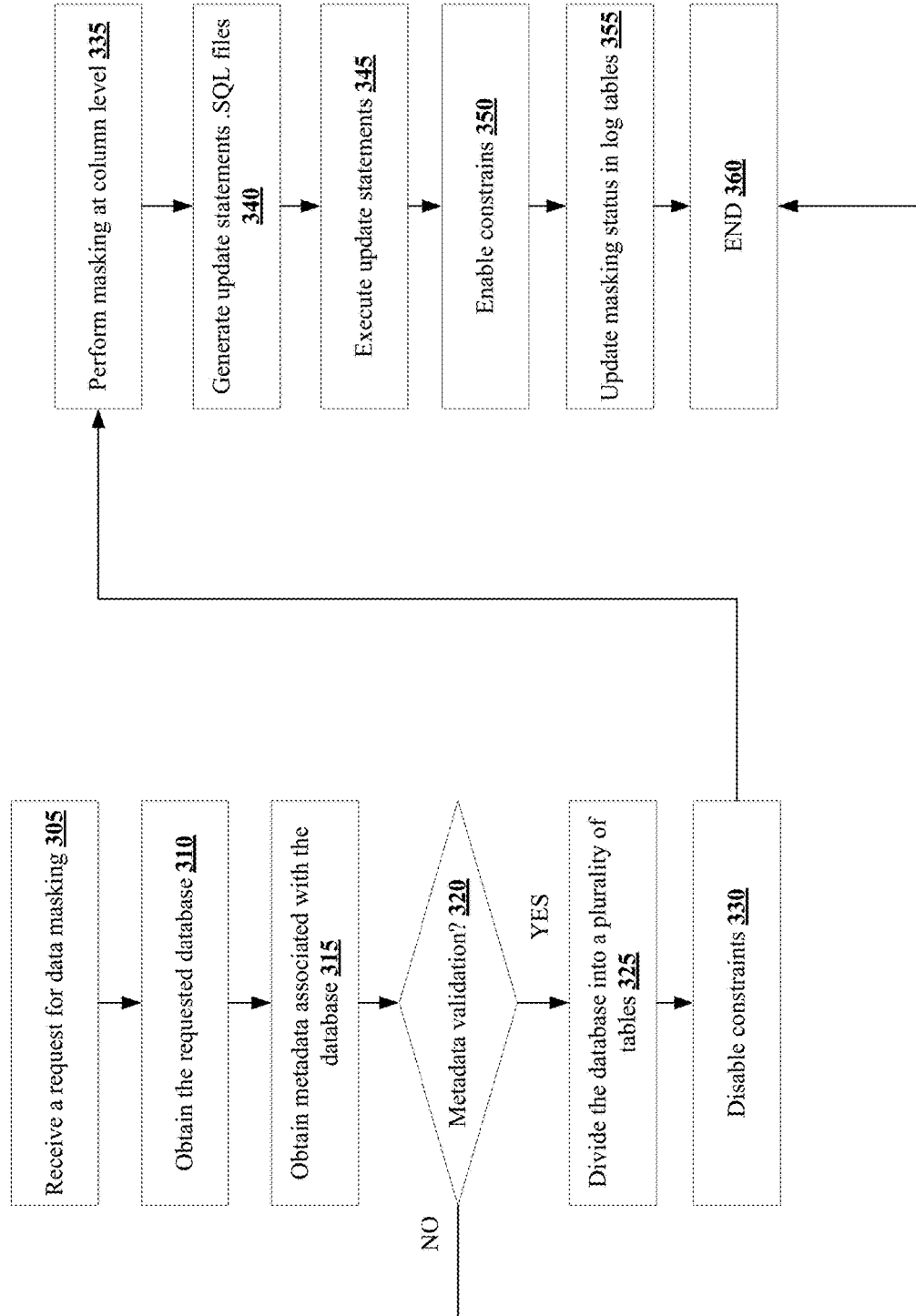
FIG. 3 is an exemplary flowchart of a method for data masking.

A network environment 10 with an example of a data masking apparatus 14 is illustrated in FIGS. 1-2. In this particular example, the environment 10 includes the data masking apparatus 14, client computing devices 12(1)-12(n), plurality of server databases 16(1)-16(n) coupled via one or more communication networks 30, although the environment could include other types and numbers of systems, devices, components, and/or other elements as is generally known in the art and will not be illustrated or described herein. This technology provides a number of advantages including providing methods, non-transitory computer readable medium, and apparatuses that system that provides more effective and accurate data masking.

Referring more specifically to FIGS. 1-2, the data masking apparatus 14 is programmed to perform a number of data management operations including data masking, although the apparatus can perform other types and/or numbers of functions and/or other operations. In this particular example, the data masking apparatus 14 includes a processor 18, a memory 20, and a communication system 24 which are coupled together by a bus 26, although the data masking apparatus 14 may comprise other types and/or numbers of physical and/or virtual systems, devices, components, and/or other elements in other configurations.

The processor 18 in the data masking apparatus 14 may execute one or more programmed instructions stored in the memory 20 for data masking as illustrated and described in the examples herein, although other types and numbers of functions and/or other operations can be performed. The processor 18 in the data masking apparatus 14 may include one or more central processing units and/or general purpose processors with one or more processing cores, for example.

The memory 20 in the data masking apparatus 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication system 24 in the data masking apparatus 14 operatively couples and communicates between one or more of the client computing devices 12(1)-12(n) and one or more of the plurality of server databases 16(1)-16(n), which are all coupled together by one or more of the communication networks 30, although other types and numbers of communication networks or systems with other types and numbers of connections and configurations to other devices and elements. By way of example only, the communication networks 30 can use TCP/IP over Ethernet and industry-standard protocols, including NFS, CIFS, SOAP, XML, LDAP, SCSI, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the client computing devices 12(1)-12(n) may interact with applications executing on the data masking apparatus 14 and/or the plurality of server databases 16(1)-16(n), although the plurality of client computing devices 12(1)-12(n) can interact with the data masking apparatus 14 or the plurality of server databases 16(1)-16(n). Each of the client computing devices 12(1)-12 (n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements.

The plurality of server databases 16(1)-16(n) may store and provide data files, by way of example only, to the data masking apparatus 14 via one or more of the communication networks 30, for example, although other types and/or numbers of storage media in other configurations could be used. Additionally, the plurality of server databases 16(1)-16(n) hosts a plurality data tables that the plurality of client computing devices 12(1)-12(n) can access via the data masking apparatus 14. In this particular example, each of the plurality of server databases 16(1)-16(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the plurality of server databases 16(1)-16(n) and may transmit data in response to requests from the data masking apparatus 14. Each the plurality of server databases 16(1)-16(n) may include a processor, a memory, and a communication interface, which are coupled together by a bus or other link, although each may have other types and/or numbers of other systems, devices, components, and/or other elements.

Although the exemplary network environment 10 with the data masking apparatus 14, the plurality of client computing devices 12(1)-12(n), the plurality of server databases 16(1)-16(n), and the communication networks 30 are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for data masking will now be described with reference to FIGS. 1-8. In step 305, the data masking apparatus 14 receives a request for data masking of one or more databases from one of the plurality of client computing devices 12(1)-12(n), although the data masking apparatus 14 can receive request to perform data masking on other data, such as a specific table or a schema of a specific database, by way of example. In this example, the data in the one or more databases can include financial data associated with one or more customers, although the database can include other types or amounts of information.

In step 310, the data masking apparatus 14 obtains the database for which the data masking has been requested from one of the plurality of server databases 16(1)-16(n), although the data masking apparatus 14 can obtain the database from other locations.

Figure 4:
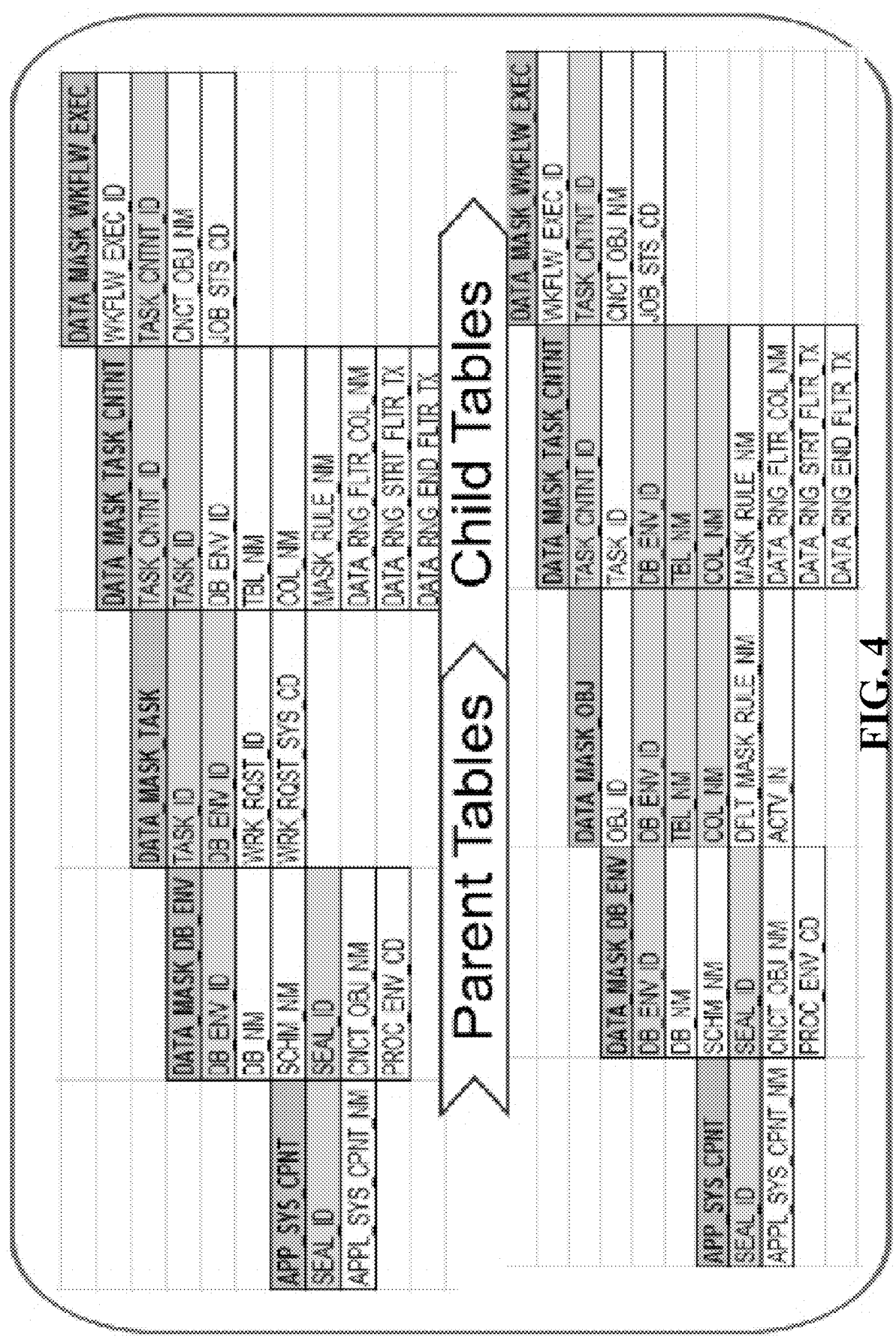
FIG. 4 is an exemplary illustration of a database divided into a plurality of tables.

Next in step 315, the data masking apparatus 14 obtains the metadata associated with the obtained database. In this example, the metadata of the database includes data associated with the rows and columns of the obtained database, although the metadata can include other types or amounts of information. An example of the metadata associated with the database is illustrated in FIG. 4.

In step 320, the data masking apparatus 14 performs validation of the metadata. In this example for the metadata validation, the data masking apparatus 14 compares the received request with the obtained metadata to determine if the received request has the data necessary to perform the data masking. In this example, if the data masking apparatus 14 determines that the received request does not include the data necessary to perform data masking, then the No branch is taken to step 360 where the data masking apparatus 14 rejects the received request and the exemplary method ends. However, if the data masking apparatus 14 determines that the received request does include the data necessary to perform data masking, then the Yes branch is taken to step 325.

In step 325, the data masking apparatus 14 divides the obtained database into a plurality of tables. An example of the data masking apparatus 14 dividing the obtained database into a plurality of tables is illustrated in FIG. 4. By dividing the database into a plurality of tables, the disclosed technology is able to achieve parallelism to perform data masking more efficiently and quickly when compared to the existing technologies. Additionally in this example, each of the divided tables can be converted into a trigger file that would assist with the data masking of the database.

Figure 6:
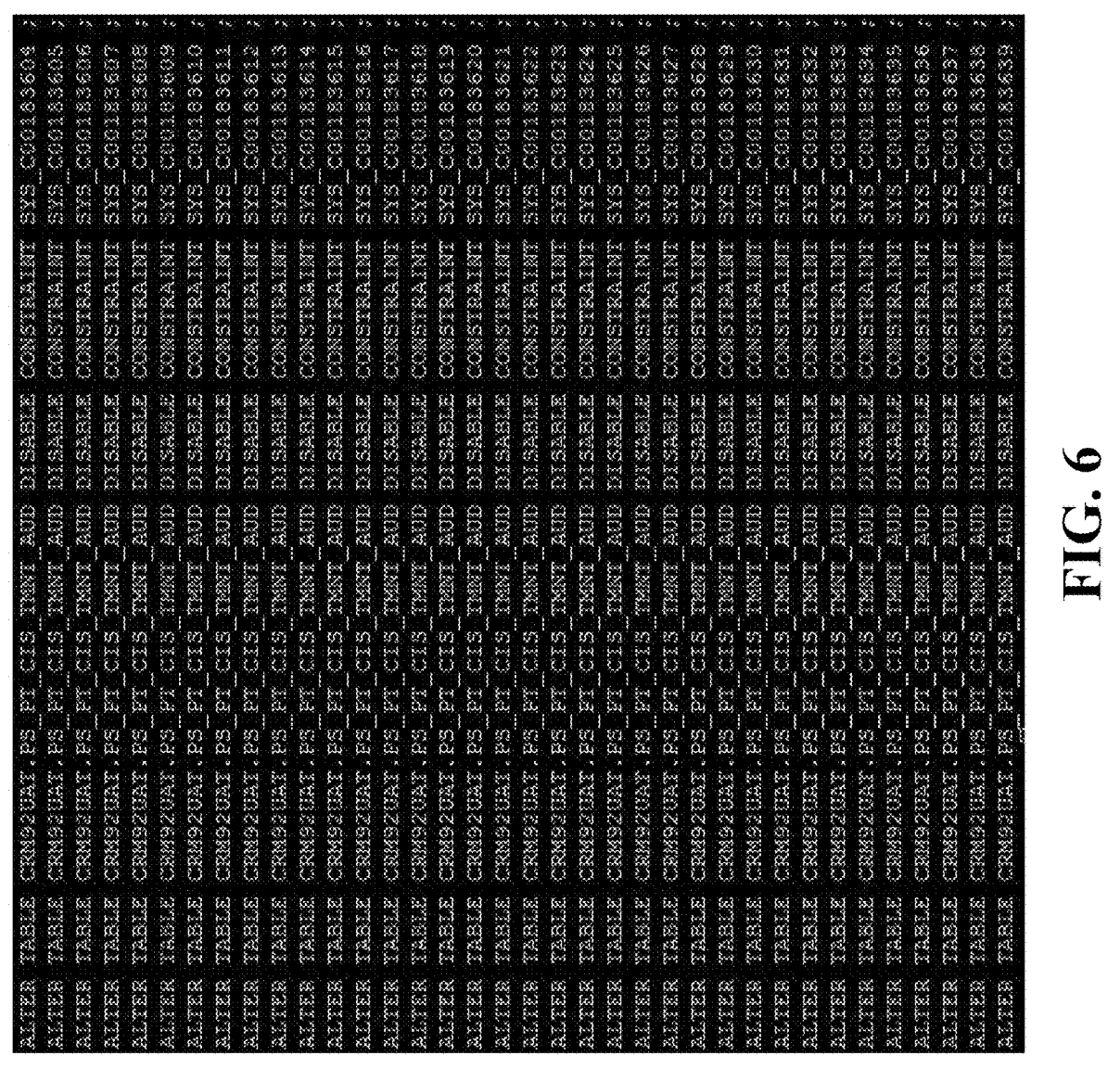

In step 330, the data masking apparatus 14 disables constraints associated with the database table. By way of example, constraints relates to the relationship of the data present in one cell of the database table to the data present in other cells, although the constraints can include other types or amounts of rules present in the database tables. In this example, FIG. 6 illustrates an example of the data masking apparatus 14 disabling the constraints.

Figure 5:
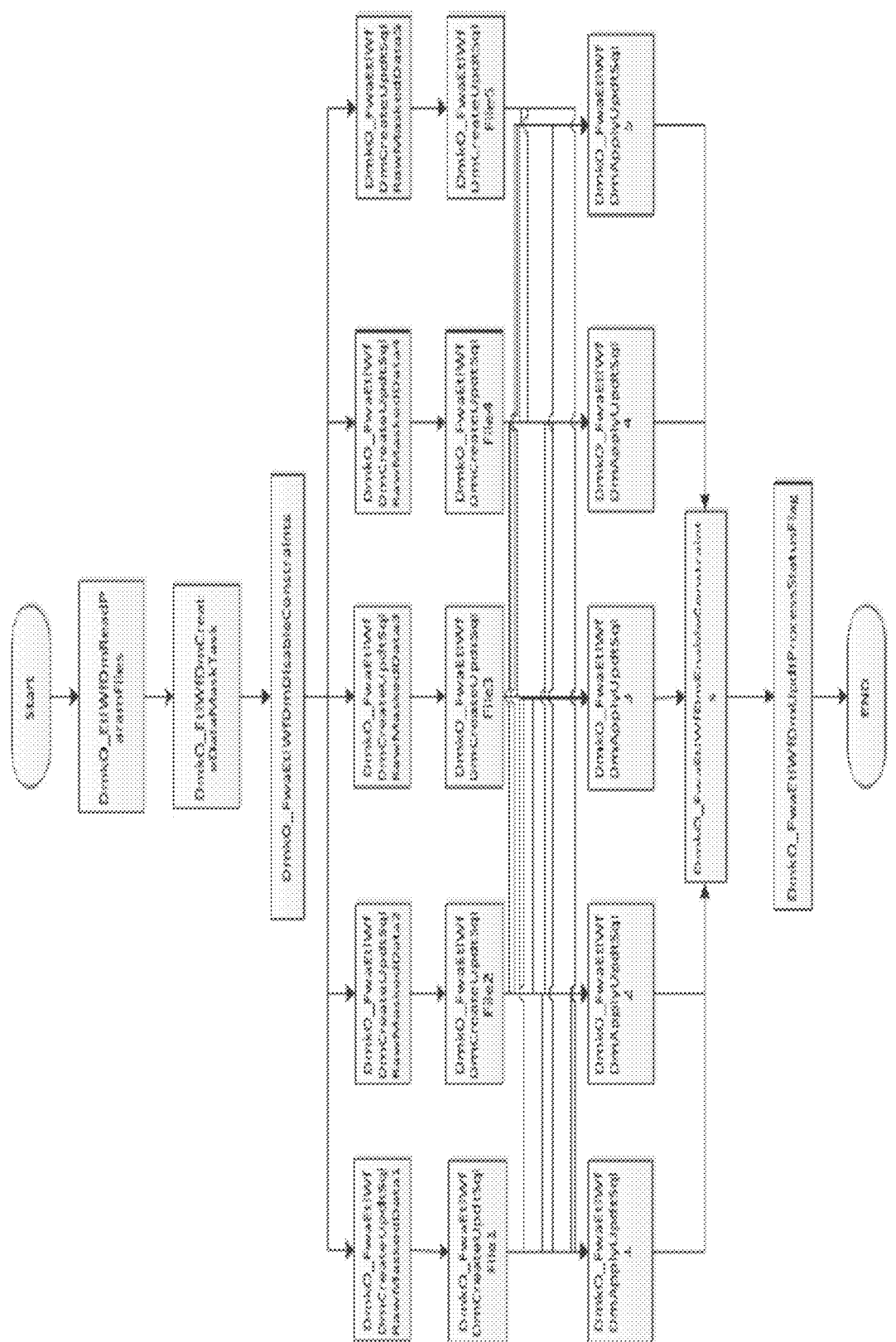
FIG. 5 is an exemplary illustration of data masking at a column level.

In step 335, the data masking apparatus 14 performs data masking at a column level in the database table, although the data masking apparatus 14 can perform data masking using other techniques. An illustration of the column level data masking is illustrated in FIG. 5.

Figure 7:
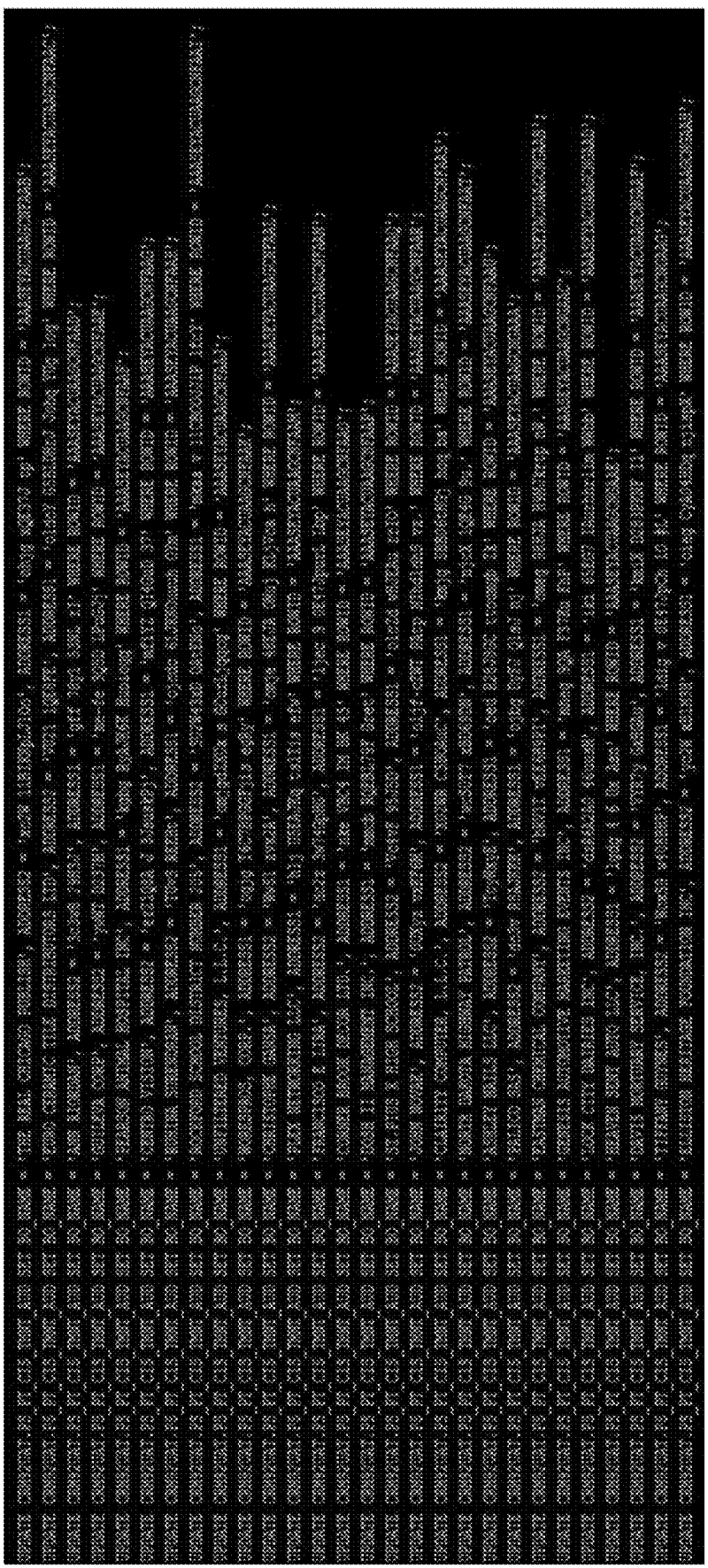
FIG. 7 is an exemplary illustration of the masked data.

In step 340, the data masking apparatus 14 generates one or more update statements about the data masking into a structured query language (SQL) file, although the data masking apparatus 14 can generate the update statement in other formats. In this example, the update statements are generated based on the output of the data masking, although the update statements can be generated based on other types or numbers of parameters. By way of example, as illustrated in FIG. 7, each record that has all its confidential data masked with the preconfigured algorithm is converted into a single row SQL update statement for performance. In FIG. 6, SQLs are generated to update columns (BO_NAME, ADDRESS1, ADDRESS2, etc.) in table_PS_PT-_CIS_TMNT_AUD with masked values using a single SQL statement.

Next in step 345, the data masking apparatus 14 executes the SQL file on the database table. By executing the SQL file, the disclosed technology is able to covert the obtained database into a data masked database to encrypt or protect the integrity of the data.

Figure 8:
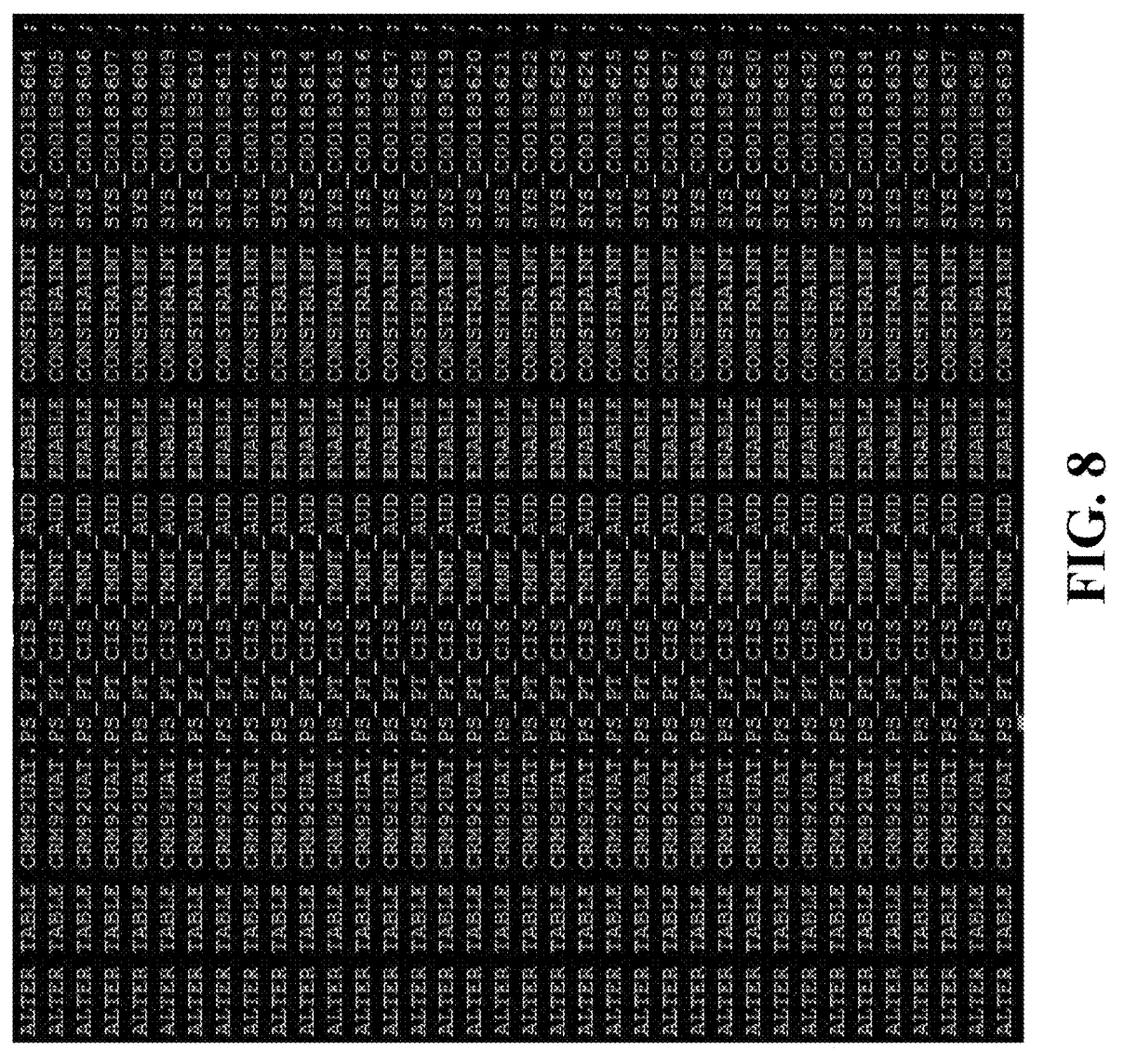

In step 350, the data masking apparatus 14 enables the constraints that were disabled in step 330. By enabling the constraints, the disclosed technology is able to maintain the relationship and rules that were present in the database that was obtained back in step 310. By way of example, an exemplary illustration of the data masking apparatus 14 enabling the constraints is illustrated in FIG. 8.

In step 355, the data masking apparatus 14 updates the log status with the time, date and the corresponding request for which the data masking was performed in the log table and the exemplary method ends at step 360.

Accordingly, as illustrated by way of the examples herein this technology provides more effective and accurate data masking. Additionally, this technology enables masked data to easily be recovered from any point of failure during the masking process.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for data masking comprising:
   obtaining, by a data masking apparatus, a database and metadata associated with the database in response to a received request for data masking;
   validating, by the data masking apparatus, the obtained metadata comparing the obtained metadata with the received request to determine whether the received request includes sufficient information for performing a data masking operation;
   performing, by the data masking apparatus, a data masking operation on the obtained database at a column level when the determination indicates the received request is validated; and
   storing, by the data masking apparatus, a record of the performance of the data masking operation on the obtained database at the column level.

2. The method as set forth in claim 1 further comprising, dividing, by the data masking apparatus, the obtained database into a plurality of database tables prior to performing the data masking operation.

3. The method as set forth in claim 1 further comprising, disabling, by the data masking apparatus, one or more constraints in the obtained database prior to performing the data masking operation, wherein each of the one or more constraints relates to a relationship between data in a first cell of the obtained database and data in other cells of the obtained database.

4. The method as set forth in claim 2 wherein the data masking operation is performed on one or more columns of the divided plurality of database tables.

5. The method as set forth in claim 4 further comprising, generating, by the data masking apparatus, one or more structured query language files from the data masked plurality of database tables.

6. The method as set forth in claim 3 further comprising, enabling, by the data masking apparatus, the one or more constraints after performing the data masking.

7. A non-transitory computer readable medium having stored thereon instructions for data masking comprising executable code, which when executed by at least one processor, cause the processor to:
   obtain a database and metadata associated with the database in response to a received request for data masking;
   validate the obtained metadata by comparing the obtained metadata with the received request to determine whether the received request includes sufficient information for performing a data masking operation;

perform a data masking operation on the obtained database at a column level when the determination indicates the received request is validated; and store a record of the performance of the data masking operation on the obtained database at the column level.

8. The medium as set forth in claim 7 further comprising, divide the obtained database into a plurality of database tables prior to performing the data masking operation.

9. The medium as set forth in claim 7 further comprising, disabling one or more constraints in the obtained database prior to performing the data masking operation, wherein each of the one or more constraints relates to a relationship between data in a first cell of the obtained database and data in other cells of the obtained database.

10. The medium as set forth in claim 8 wherein the data masking operation is performed on one or more columns of the divided plurality of database tables.

11. The medium as set forth in claim 10 further comprising, generating one or more structured query language files from the data masked plurality of database tables.

12. The medium as set forth in claim 9 further comprising enabling the one or more constraints after performing the data masking.

13. A data masking apparatus comprising:

a processor; and a memory coupled to the processor which is configured to be capable of executing programmed instructions comprising and stored in the memory to:

obtain a database and metadata associated with the database in response to a received request for data masking;

validate the obtained metadata by comparing the obtained metadata with the received request to determine whether the received request includes sufficient information for performing a data masking operation;

perform a data masking operation on the obtained database at a column level when the determination indicates the received request is validated; and store a record of the performance of the data masking operation on the obtained database at the column level.

14. The apparatus as set forth in claim 13 wherein the processor is further configured to be capable of executing the stored programmed instructions to divide the obtained database into a plurality of database tables prior to performing the data masking operation.

15. The apparatus as set forth in claim 13 wherein the processor is further configured to be capable of executing the stored programmed instructions to disable one or more constraints in the obtained database prior to performing the data masking operation, wherein each of the one or more constraints relates to a relationship between data in a first cell of the obtained database and data in other cells of the obtained database.

16. The apparatus as set forth in claim 14 wherein the data masking operation is performed on one or more columns of the divided plurality of database tables.

17. The apparatus as set forth in claim 16 wherein the processor is further configured to be capable of executing the stored programmed instructions to generate one or more structured query language files from the data masked plurality of database tables.

18. The apparatus as set forth in claim 15 wherein the processor is further configured to be capable of executing the stored programmed instructions to enable the one or more constraints after performing the data masking.

\* \* \* \* \*